US011862868B2

(12) United States Patent
Wong et al.

(10) Patent No.: US 11,862,868 B2
(45) Date of Patent: Jan. 2, 2024

(54) MULTI-FEED ANTENNA

(71) Applicant: Industrial Technology Research Institute, Hsinchu (TW)

(72) Inventors: Kin-Lu Wong, Kaohsiung (TW); Wei-Yu Li, Yilan County (TW); Wei Chung, Hsinchu County (TW)

(73) Assignee: Industrial Technology Research Institute, Hsinchu (TW)

( * ) Notice: Subject to any disclaimer, the term of this patent is extended or adjusted under 35 U.S.C. 154(b) by 0 days.

(21) Appl. No.: 17/555,503

(22) Filed: Dec. 20, 2021

(65) Prior Publication Data

US 2023/0198148 A1 Jun. 22, 2023

(51) Int. Cl.
*H01Q 5/45* (2015.01)
*H01Q 5/307* (2015.01)
(Continued)

(52) U.S. Cl.
CPC ............... *H01Q 5/45* (2015.01); *H01Q 1/523* (2013.01); *H01Q 5/307* (2015.01); *H01Q 9/0457* (2013.01); *H01Q 21/28* (2013.01)

(58) Field of Classification Search
CPC .... H01Q 9/0414; H01Q 9/0421; H01Q 9/045; H01Q 9/0464; H01Q 5/45; H01Q 1/523; H01Q 5/307; H01Q 9/0457; H01Q 21/28
See application file for complete search history.

(56) References Cited

U.S. PATENT DOCUMENTS

| | | | | |
|---|---|---|---|---|
| 4,460,899 A | | 7/1984 | Schmidt et al. | |
| 4,590,478 A | * | 5/1986 | Powers | H01Q 21/24 343/770 |

(Continued)

FOREIGN PATENT DOCUMENTS

| | | | | |
|---|---|---|---|---|
| CN | 206727220 | | 12/2017 | |
| CN | 109449585 A | * | 3/2019 | H01Q 1/38 |
| CN | 110875519 | | 3/2020 | |
| CN | 211578982 | | 9/2020 | |
| CN | 109494456 | | 11/2020 | |
| TW | M527621 | | 8/2016 | |

(Continued)

OTHER PUBLICATIONS

Notice of allowance of Taiwan Counterpart Application, dated Nov. 10, 2022, p. 1-p. 3.

(Continued)

*Primary Examiner* — Ab Salam Alkassim, Jr.
*Assistant Examiner* — Anh N Ho
(74) *Attorney, Agent, or Firm* — JCIPRNET

(57) ABSTRACT

The disclosure provides a multi-feed antenna including a first conductor layer, a second conductor layer, four supporting conductor structures and four feeding conductor lines. The second conductor layer has a first center position and is spaced apart from the first conductor layer at a first interval. The four electrically connected sections respectively extend from different side edges of the second conductor layer toward the first center position, so that the second conductor layer forms four mutually connected radiating conductor plates. The four feeding conductor lines are all located between the first conductor layer and the second conductor layer. The four feeding conductor lines and the four supporting conductor structures form an interleaved annular arrangement. The four feeding conductor lines excite the second conductor layer to generate at least four resonant modes. The at least four resonant modes cover at least one identical first communication band.

13 Claims, 6 Drawing Sheets

(51) Int. Cl.

| | |
|---|---|
| ***H01Q 21/28*** | (2006.01) |
| ***H01Q 1/52*** | (2006.01) |
| ***H01Q 9/04*** | (2006.01) |

(56) References Cited

U.S. PATENT DOCUMENTS

| | | | | |
|---|---|---|---|---|
| 5,241,321 | A | 8/1993 | Tsao | |
| 5,581,266 | A * | 12/1996 | Peng | H01Q 13/106 343/770 |
| 5,952,983 | A | 9/1999 | Dearnley et al. | |
| 5,990,838 | A | 11/1999 | Burns et al. | |
| 6,104,348 | A | 8/2000 | Karlsson et al. | |
| 6,288,679 | B1 | 9/2001 | Fischer et al. | |
| 6,344,829 | B1 | 2/2002 | Lee | |
| 6,426,723 | B1 | 7/2002 | Smith et al. | |
| 7,250,910 | B2 | 7/2007 | Yoshikawa et al. | |
| 7,271,777 | B2 | 9/2007 | Yuanzhu | |
| 7,330,156 | B2 | 2/2008 | Arkko et al. | |
| 7,352,328 | B2 | 4/2008 | Moon et al. | |
| 7,385,563 | B2 | 6/2008 | Bishop | |
| 7,405,699 | B2 | 7/2008 | Qin | |
| 7,423,595 | B2 | 9/2008 | Saily | |
| 7,460,069 | B2 | 12/2008 | Park et al. | |
| 7,498,997 | B2 | 3/2009 | Moon et al. | |
| 7,541,988 | B2 | 6/2009 | Sanelli et al. | |
| 7,561,110 | B2 | 7/2009 | Chen | |
| 7,573,433 | B2 | 8/2009 | Qin | |
| 7,586,445 | B2 | 9/2009 | Qin et al. | |
| 7,609,221 | B2 | 10/2009 | Chung et al. | |
| 7,688,273 | B2 | 3/2010 | Montgomery et al. | |
| 7,710,343 | B2 | 5/2010 | Chiu et al. | |
| 7,714,789 | B2 | 5/2010 | Tsai et al. | |
| 7,733,285 | B2 | 6/2010 | Gainey et al. | |
| 7,994,985 | B2 | 8/2011 | Luk et al. | |
| 9,520,655 | B2 | 12/2016 | Cerreno | |
| 9,748,655 | B2 * | 8/2017 | Lee | H01Q 9/0435 |
| 10,044,111 | B2 | 8/2018 | Murdock et al. | |
| 2002/0021255 | A1 | 2/2002 | Zhang et al. | |
| 2002/0044098 | A1 * | 4/2002 | Von Stein | H01Q 13/106 343/770 |
| 2005/0237258 | A1 | 10/2005 | Abramov et al. | |
| 2009/0322639 | A1 | 12/2009 | Lai | |
| 2010/0134377 | A1 | 6/2010 | Tsai et al. | |
| 2010/0156745 | A1 | 6/2010 | Andrenko et al. | |
| 2010/0156747 | A1 | 6/2010 | Montgomery | |
| 2010/0238079 | A1 | 9/2010 | Ayatollahi et al. | |
| 2010/0295736 | A1 | 11/2010 | Su | |
| 2010/0295750 | A1 | 11/2010 | See et al. | |
| 2011/0199279 | A1 * | 8/2011 | Shen | H01Q 9/0414 343/700 MS |
| 2012/0038525 | A1 * | 2/2012 | Monsalve Carcelen | H01Q 1/286 343/705 |
| 2015/0229026 | A1 * | 8/2015 | Lindmark | H01Q 21/24 343/770 |
| 2017/0125919 | A1 * | 5/2017 | Chien | H01Q 9/045 |
| 2017/0155191 | A1 * | 6/2017 | Kim | E02D 29/14 |
| 2020/0295470 | A1 * | 9/2020 | Panther | H01Q 15/244 |
| 2020/0303807 | A1 | 9/2020 | Caratelli et al. | |
| 2020/0350690 | A1 | 11/2020 | Hsiao et al. | |
| 2021/0028556 | A1 | 1/2021 | Brar et al. | |

FOREIGN PATENT DOCUMENTS

| | | |
|---|---|---|
| TW | I704723 | 9/2020 |
| TW | I704726 | 9/2020 |

OTHER PUBLICATIONS

J. Coetzee and Y. Liu, "Compact multiport antenna with isolated ports," Microwave and Optical Technology Letters, vol. 50, No. 1, Jan. 2008, pp. 229-232.

Yuan Ding; et al., "A Novel Dual-Band Printed Diversity Antenna for Mobile Terminals," IEEE Transactions on Antennas and Propagation, vol. 55, No. 7, Jul. 2007, pp. 2088-2096.

Qingyuan Liu; et al., "A Compact Wideband Planar Diversity Antenna for Mobile Handsets" Microwave and Optical Technology Letters, vol. 50, No. 1, Jan. 2008, pp. 87-91.

Jui-Hung Chou and Saou-Wen Su, "Internal Wideband Monopole Antenna for Mimo Access-Point Applications in the WLAN/WIMAX Bands," Microwave and Optical Technology Letters, vol. 50, No. 5, May 2008, pp. 1146-1148.

Saou-Wen Su; et al., "Printed Coplanar Two-Antenna Element For 2.4/5 Ghz WLAN Operation in a MIMO System,"Microwave and Optical Technology Letters, vol. 50, No. 6, Jun. 2008, pp. 1635-1638.

Jonathan Ethier; et al., "MIMO Handheld Antenna Design Approach Using Characteristic Mode Concepts," Microwave and Optical Technology Letters, vol. 50, No. 7, Jul. 2008, pp. 1724-1727.

Shin-Chang Chen; et al., "A Decoupling Technique for Increasing the Port Isolation Between Two Strongly Coupled Antennas," in IEEE Transactions on Antennas and Propagation, vol. 56, No. 12, Dec. 2008, pp. 3650-3658.

Yaxing Cai; et al., "A Novel Wideband Diversity Antenna for Mobile Handsets," Microwave and Optical Technology Letters, vol. 51, No. 1, Jan. 2009, pp. 218-222.

Jung-Hwan Choi; et al., "Performance Evaluation Of 2 x 2 MIMO Handset Antenna Arrays for Mobile WiMAX APPLICATIONS," Microwave and Optical Technology Letters, vol. 51, No. 6, Jun. 2009, pp. 1558-1561.

Saou-Wen Su, "A Three-In-One Diversity Antenna System For 5 Ghz WLAN Applications," Microwave and Optical Technology Letters, vol. 51, No. 10, Oct. 2009, pp. 2477-2481.

Ting-Wei Kang and Kin-Lu Wong, "Isolation Improvement Of 2.4/5.2/5.8 Ghz WLAN Internal Laptop Computer Antennas Using Dual-Band Strip Resonator as a Wavetrap," Microwave and Optical Technology Letters, vol. 52, No. 1, Jan. 2010, pp. 58-64.

Saou-Wen Su, "Concurrent Dual-Band Six-Loop-Antenna System With Wide 3-dB Beamwidth Radiation for MIMO Access Points" Microwave and Optical Technology Letters, vol. 52, No. 6, Jun. 2010, pp. 1253-1258.

Hongpyo Bae; et al., "Compact Mobile Handset MIMO Antenna for LTE700 Applications," Microwave and Optical Technology Letters, vol. 52, No. 11, Nov. 2010, pp. 2419-2422.

Minseok Han and Jaehoon Choi, "MIMO Antenna Using a Decoupling Network for 4G USB Dongle Application," Microwave and Optical Technology Letters, vol. 52, No. 11, Nov. 2010, pp. 2551-2554.

Dongho Kim; et al., "Design of a Dual-Band MIMO Antenna for Mobile WiMAX APPLICATION," Microwave and Optical Technology Letters, vol. 53, No. 2, Feb. 2011, pp. 410-414.

Chao-Ming Luo; et al., "Isolation Enhancement of a Very Compact UWB-MIMO Slot Antenna With Two Defected Ground Structures," IEEE Antennas and Wireless Propagation Letters, vol. 14, Apr. 2015, pp. 1766-1769.

G. Srivastava and A. Mohan, "Compact MIMO Slot Antenna for UWB Applications," IEEE Antennas and Wireless Propagation Letters, vol. 15, 2016, pp. 1057-1060.

Peng Gao; et al., "Compact Printed UWB Diversity Slot Antenna With 5.5-GHz Band-Notched Characteristics," IEEE Antennas and Wireless Propagation Letters, vol. 13, Feb. 2014, pp. 376-379.

Reza Karimian et al., "Novel F-Shaped Quad-Band Printed Slot Antenna for WLAN and WiMAX MIMO Systems," IEEE Antennas and Wireless Propagation Letters, vol. 12, Mar. 2013, pp. 405-408.

Yan-Yan Liu and Zhi-Hong Tu, "Compact Differential Band-Notched Stepped-Slot UWB-MIMO Antenna With Common-Mode Suppression," IEEE Antennas and Wireless Propagation Letters, vol. 16, 2017, pp. 593-596.

Julien Sarrazin et al., "Investigation on Cavity/Slot Antennas for Diversity and MIMO Systems: The Example of a Three-Port Antenna," IEEE Antennas and Wireless Propagation Letters, vol. 7, Feb. 2008, pp. 414-417.

Kasra Payandehjoo and Ramesh Abhari, "Employing EBG Structures in Multiantenna Systems for Improving Isolation and Diversity Gain," IEEE Antennas and Wireless Propagation Letters, vol. 8, Oct. 2009, pp. 1162-1165.

(56) References Cited

OTHER PUBLICATIONS

K. Payandehjoo and R. Abhari, "Suppression of substrate coupling between slot antennas using electromagnetic bandgap structures," 2008 IEEE Antennas and Propagation Society International Symposium, Jul. 5-11, 2008, pp. 1-4.
Le Kang; et al., "Compact Offset Microstrip-Fed MIMO Antenna for Band-Notched UWB Applications," in IEEE Antennas and Wireless Propagation Letters, vol. 14, Apr. 2015, pp. 1754-1757.
Peng Gao and Shuang He, "A Compact UWB and Bluetooth Slot Antenna for MIMO/Diversity Applications," ETRI Journal, vol. 36, Issue 2, Apr. 2014, pp. 309-312.
Mohammad S. Sharawi; et al., "A Two Concentric Slot Loop Based Connected Array MIMO Antenna System for 4G/5G Terminals," IEEE Transactions on Antennas and Propagation, vol. 65, No. 12, Dec. 2017, pp. 6679-6686.
Da Qing Liu; et al., "An Extremely Low-Profile Wideband MIMO Antenna for 5G Smartphones," IEEE Transactions on Antennas and Propagation, vol. 67, No. 9, Sep. 2019, pp. 5772-5780.
Biao Li; et al., "Wideband Dual-Polarized Patch Antenna With Low Cross Polarization and High Isolation," IEEE Antennas and Wireless Propagation Letters, vol. 11, Apr. 2012, pp. 427-430.

* cited by examiner

MULTI-FEED ANTENNA

TECHNICAL FIELD

The technical field relates to a multi-feed antenna design, and relates to a multi-feed antenna design architecture capable of achieving multi-antenna integration.

BACKGROUND

In order to be able to improve the quality of wireless communication and the data transmission rate, the pattern switchable multi-antenna array architecture and the multi-input multi-output (MIMO) multi-antenna architecture have been widely used. Antenna designs with the advantages of multi-antenna unit integration have become one of the hot research topics. However, a plurality of adjacent antennas operating in the same frequency band may cause mutual coupling interference and adjacent environment coupling interference. Therefore, the isolation between multiple antennas may deteriorate, and the antenna radiation characteristics may be attenuated. As a result, the data transmission speed would decrease, and the difficulty of multi-antenna integration is increased. Therefore, how to successfully design a broadband antenna unit into a highly integrated multi-antenna array and achieve the advantages of good matching and good isolation at the same time would be a technical challenge that may not easy to overcome.

Some related prior art documents have proposed a design method in which periodic structures are designed on the ground between multiple antennas as an energy isolator to improve the energy isolation between multiple antennas and to suppress interference from adjacent environments. However, such a design method may cause instability during manufacturing process, which may further increase the cost of mass production. Moreover, such design method may cause additional coupling current to be excited, which in turn causes the correlated coefficients between multiple antennas to increase. In addition, such design method may also increase the overall size of the multi-antenna array, so such method could not be easily and widely applied to various wireless devices or apparatuses.

Therefore, a design method that could solve the above-mentioned problems is needed to meet the practical application requirements of future high data transmission speed communication devices or apparatuses.

SUMMARY

In view of this, an embodiment of the disclosure discloses a multi-feed antenna. Some implementation examples according to the embodiment could solve the aforementioned technical problems.

According to an embodiment, the disclosure provides a multi-feed antenna. The multi-feed antenna includes a first conductor layer, a second conductor layer, four supporting conductor structures and four feeding conductor lines. The second conductor layer has a first center position, and the second conductor layer is spaced apart from the first conductor layer at a first interval. The four supporting conductor structures are all located between the first conductor layer and the second conductor layer and respectively electrically connect the first conductor layer and the second conductor layer. The four supporting conductor structures form four electrically connected sections at the second conductor layer, and the four electrically connected sections respectively extend from different side edges of the second conductor layer toward the first center position, so that the second conductor layer forms four mutually connected radiating conductor plates. The four feeding conductor lines are all located between the first conductor layer and the second conductor layer, and the four feeding conductor lines and the four supporting conductor structures form an interleaved annular arrangement.

Each of the feeding conductor lines has one end electrically connected to an electrical connection point of a coupling conductor plate, and each of the coupling conductor plates is spaced apart from a different one of the radiating conductor plates at a coupling interval. Each of the feeding conductor lines has another end electrically connected to a signal source respectively. The four feeding conductor lines excite the second conductor layer to generate at least four resonant modes, and the at least four resonant modes cover at least one identical first communication band.

In order to make the aforementioned features and other contents of the disclosure comprehensible, embodiments accompanied with drawings are described in detail as follows:

DETAILED DESCRIPTION OF DISCLOSED EMBODIMENTS

Figure 1A:
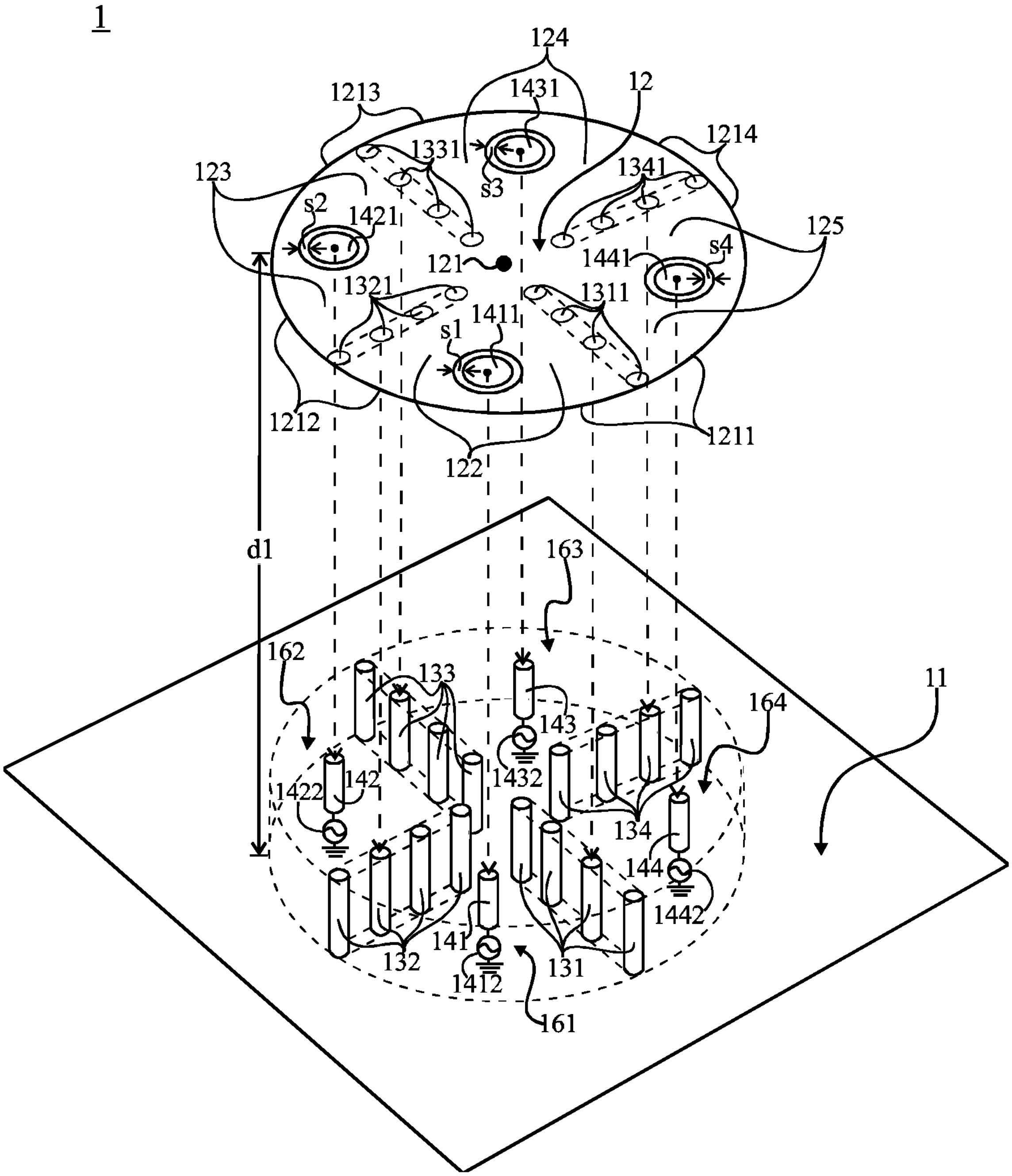
FIG. 1A is a structural diagram of a multi-feed antenna 1 according to an embodiment of the disclosure.
Figure 1B:
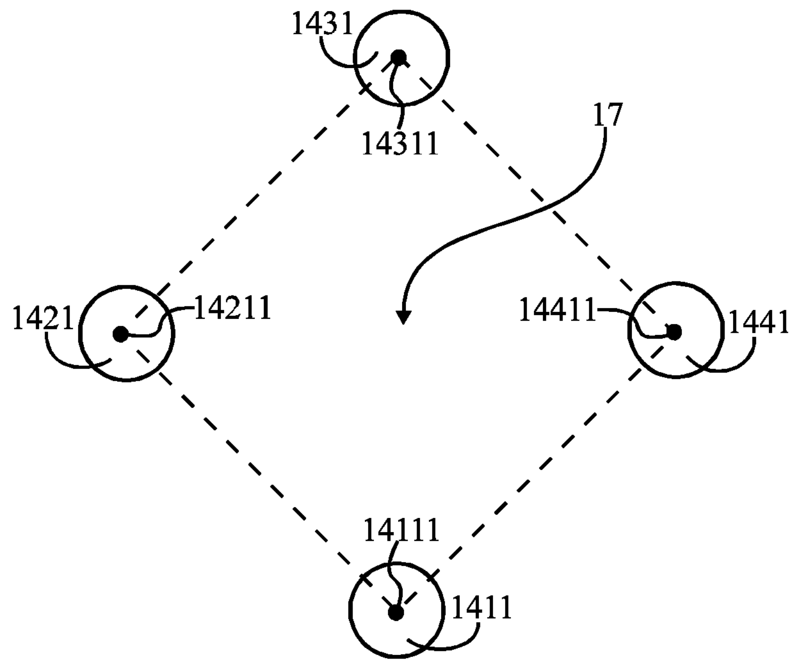
FIG. 1B is a structural diagram of an enclosed region formed by connecting lines of the four electrical connection points of the four coupling conductor plates of the multi-feed antenna 1 according to an embodiment of the disclosure.
Figure 1C:
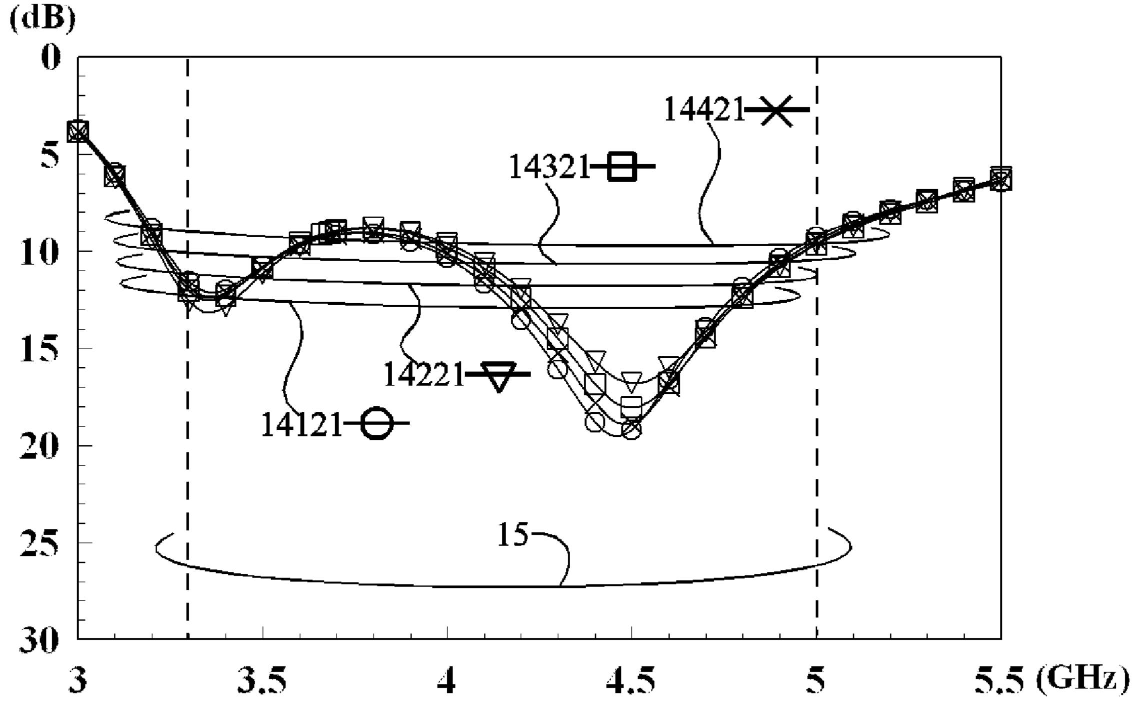
FIG. 1C is a return loss curve diagram of the multi-feed antenna 1 according to an embodiment of the disclosure.

FIG. 1A is a structural diagram of a multi-feed antenna 1 according to an embodiment of the disclosure. As shown in FIG. 1A, the multi-feed antenna 1 includes a first conductor layer 11, a second conductor layer 12, four supporting conductor structures 131, 132, 133, 134, and four feeding conductor lines 141, 142, 143, 144. The second conductor layer 12 has a first center position 121, and the second conductor layer 12 is spaced apart from the first conductor layer 11 at a first interval d1. The four supporting conductor structures 131, 132, 133, 134 are all located between the first conductor layer 11 and the second conductor layer 12, and electrically connect the first conductor layer 11 and the second conductor layer 12 respectively. The four supporting conductor structures 131, 132, 133, 134 form four electrically connected sections 1311, 1321, 1331, 1341 at the second conductor layer 12. Moreover, the four electrically connected sections 1311, 1321, 1331, 1341 respectively extend from different side edges 1211, 1212, 1213, 1214 of the second conductor layer 12 toward the first center position 121, so that the second conductor layer 12 forms four connected radiating conductor plates 122, 123, 124, 125. The supporting conductor structures 131, 132, 133, 134 are composed of a plurality of conductor lines. The four feeding conductor lines 141, 142, 143, 144 are all located between the first conductor layer 11 and the second conductor layer 12. The four feeding conductor lines 141, 142, 143, 144 and the four supporting conductor structures 131, 132, 133, 134 form an interleaved annular arrangement between the first conductor layer 11 and the second conductor layer 12. Each of the feeding conductor lines 141, 142, 143, 144 has one end electrically connected to an electrical connection point 14111, 14211, 14311, 14411 (as shown in FIG. 1B) of a coupling conductor plate 1411, 1421, 1431, 1441 respectively. Each of the coupling conductor plates 1411, 1421, 1431, 1441 is spaced apart from a different one of the radiating conductor plates 122, 123, 124, 125 at a coupling interval s1, s2, s3, s4 respectively. Each of the feeding conductor lines 141, 142, 143, 144 has another end electrically connected to a signal source 1412, 1422, 1432, 1442 respectively. The four feeding conductor lines 141, 142, 143, 144 excite the second conductor layer 12 to generate at least four resonant modes 14121, 14221, 14321, 14421 (as shown in FIG. 1C), and the at least four resonant modes 14121, 14221, 14321, 14421 cover at least one identical first communication band 15. The coupling conductor plates 1411, 1421, 1431, 1441 and the second conductor layer 12 are located on a common plane. The gap of the coupling intervals s1, s2, s3, s4 is between 0.005 wavelength and 0.088 wavelength of the lowest operating frequency of the first communication band 15. The four supporting conductor structures 131, 132, 133, 134 form four different resonant spaces 161, 162, 163, 164 in the region between the first conductor layer 11 and the second conductor layer 12, and the four feeding conductor lines 141, 142, 143, 144 are located in different resonant spaces 161, 162, 163, 164, respectively. The gap of the first interval d1 is between 0.01 wavelength and 0.38 wavelength of the lowest operating frequency of the first communication band 15. The area of the second conductor layer 12 is between 0.25 wavelength squared and 0.99 wavelength squared of the lowest operating frequency of the first communication band 15. FIG. 1B is a structural diagram of an enclosed region 17 formed by connecting lines of the four electrical connection points 14111, 14211, 14311, 14411 of the four coupling conductor plates 1411, 1421, 1431, 1441 of the multi-feed antenna 1 according to an embodiment of the disclosure. The connecting lines of the four electrical connection points 14111, 14211, 14311, 14411 constitute the enclosed region 17 whose area is between 0.1 wavelength squared and 0.49 wavelength squared of the lowest operating frequency of the first communication band 15. The area of the enclosed region 17 is smaller than the area of the second conductor layer 12. The first conductor layer 11 and the second conductor layer 12 may also be implemented on a single-layer or multi-layer dielectric substrate. According to an embodiment of the disclosure, the shape of the second conductor layer 12 of the multi-feed antenna 1 is circular, and the shape of the second conductor layer 12 could also be square, rectangular, elliptical, rhombic, polygonal or other irregular shapes, or a slot shape, or a combination thereof. The signal sources 1412, 1422, 1432, 1442 could be transmission lines, impedance matching circuits, amplifier circuits, feed-in networks, switch circuits, connector components, filter circuits, integrated circuit chips, or radio frequency front-end modules. The multi-feed antenna 1 could be configured in one set or multiple sets and applied to a multiple-input multiple-output antenna system, a pattern switching antenna system, or a beamforming antenna system.

Figure 1D:
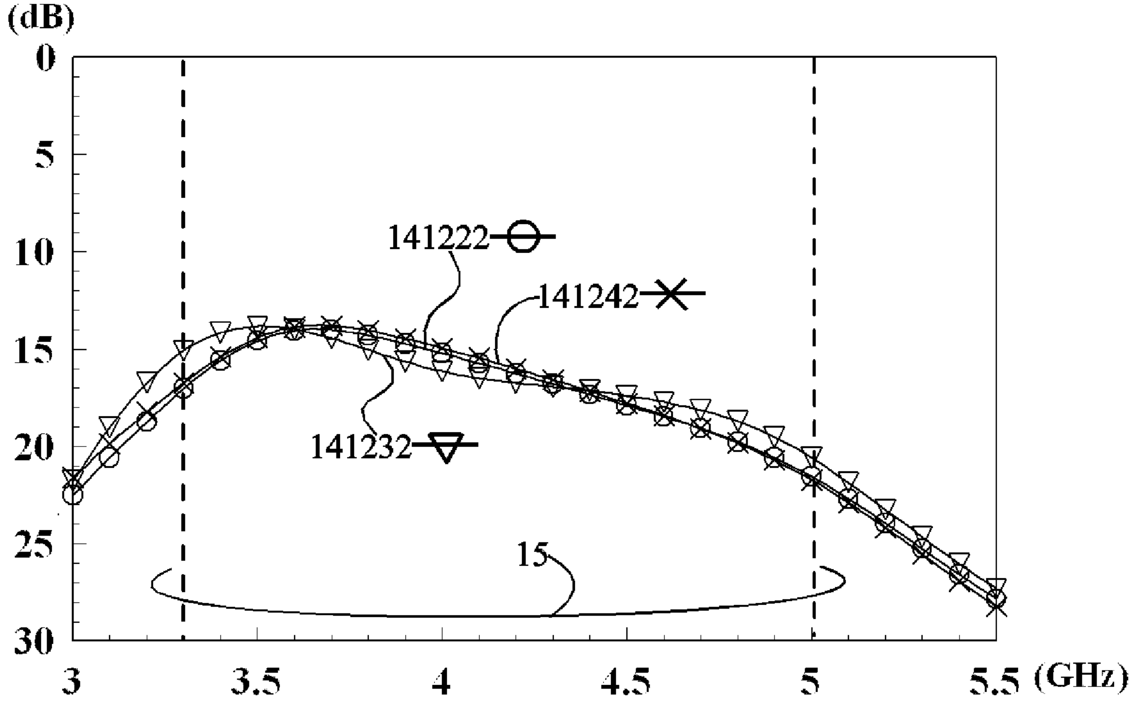
FIG. 1D is an isolation curve diagram of the multi-feed antenna 1 according to an embodiment of the disclosure.
Figure 1E:
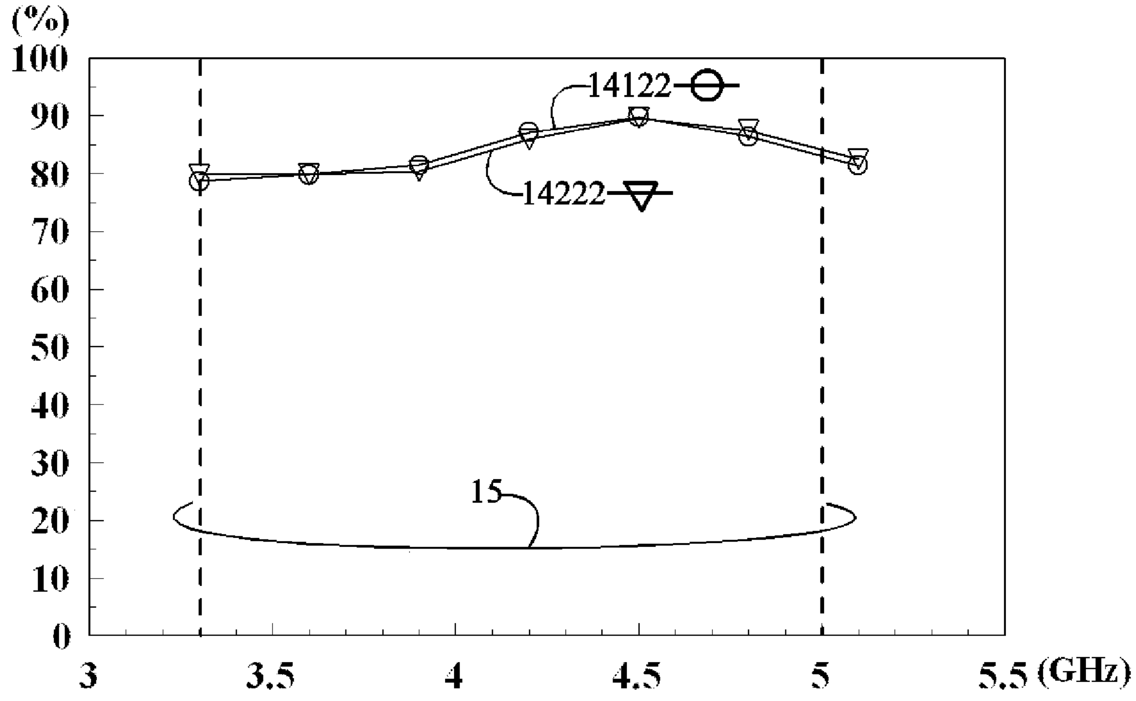
FIG. 1E is a radiation efficiency curve diagram of the multi-feed antenna 1 according to an embodiment of the disclosure.

In FIG. 1A, an embodiment of the multi-feed antenna 1 is disclosed. The multi-feed antenna 1 is designed with the four supporting conductor structures 131, 132, 133, 134 to form the four electrically connected sections 1311, 1321, 1331, 1341 at the second conductor layer 12. Moreover, the four electrically connected sections 1311, 1321, 1331, 1341 respectively extend from different side edges 1211, 1212, 1213, 1214 of the second conductor layer 12 toward the first center position 121, so that the second conductor layer 12 forms four mutually connected radiating conductor plates 122, 123, 124, 125. Thus, a technical effect of multi-antenna size reduction with the four co-excited and co-existed resonant modes 14121, 14221, 14321, 14421 could be achieved (as shown in FIG. 1C) successfully. The multi-feed antenna 1 is also designed by arranging the four feeding conductor lines 141, 142, 143, 144 and the four supporting conductor structures 131, 132, 133, 134 between the first conductor layer 11 and the second conductor layer 12 in an interleaved annular arrangement. Also, the four supporting conductor structures 131, 132, 133, 134 are designed to form four different resonant spaces 161, 162, 163, 164 in the region between the first conductor layer 11 and the second conductor layer 12, and the four feeding conductor lines 141, 142, 143, 144 are located in different resonant spaces 161, 162, 163, 164, respectively. Thus, good energy isolation could be achieved among the four resonant modes 14121, 14221, 14321, 14421 (as shown in FIG. 1D). The multi-feed antenna 1 is designed such that each of the coupling conductor plates 1411, 1421, 1431, 1441 is spaced apart from a different one of the radiating conductor plates 122, 123, 124, 125 at a coupling interval s1, s2, s3, s4 respectively. Also, the gap of the coupling intervals s1, s2, s3, s4 is designed to be between 0.005 wavelength and 0.088 wavelength of the lowest operating frequency of the first communication band 15. Thus, good impedance matching could be achieved among the four resonant modes 14121, 14221, 14321, 14421 (as shown in FIG. 1C). The multi-feed antenna 1 is designed to have the gap of the first interval d1 between 0.01 wavelength and 0.38 wavelength of the lowest operating frequency of the first communication band 15, and the area of the second conductor layer 12 between 0.25 wavelength squared and 0.99 wavelength squared of the lowest operating frequency of the first communication band 15. Also, the connecting lines of the four electrical connection points 14111, 14211, 14311, 14411 of the four coupling conductor plates 1411, 1421, 1431, 1441 are designed to constitute an enclosed region 17 whose area is between 0.1 wavelength squared and 0.49 wavelength squared of the lowest operating frequency of the first communication band 15, and the area of the enclosed region 17 is smaller than the area of the second conductor layer 12. Thus, the multi-feed antenna 1 could be excited to generate good radiation efficiency characteristics (as shown in FIG. 1E). The multi-feed antenna 1 may be configured in one set or multiple sets and applied to a multiple-input multiple-output antenna system, a pattern switching antenna system, or a beamforming antenna system. Therefore, the multi-feed antenna 1 according to an embodiment of the disclosure could achieve the technical effect of multi-antenna integration with compatibility characteristics.

FIG. 1C is a return loss curve diagram of the multi-feed antenna 1 according to an embodiment of the disclosure. The following dimensions were chosen for experimentation: the gap of the first interval d1 is about 11 mm; the area of the second conductor layer 12 is approximately 2500 $mm^2$; the area of the enclosed region 17 is approximately 733 $mm^2$; the coupling intervals s1, s2, s3, s4 are all about 2 mm. As shown in FIG. 1C, the signal sources 1412, 1422, 1432, 1442 excite the multi-feed antenna 1 to generate four resonant modes 14121, 14221, 14321, 14421 with good impedance matchings, and the four resonant modes 14121, 14221, 14321, 14421 cover at least one first communication band 15. In this embodiment, the frequency range of the first communication band 15 is 3300 MHz to 5000 MHz, and the lowest operating frequency of the first communication band 15 is 3300 MHz. FIG. 1D is an isolation curve diagram of the multi-feed antenna 1 according to an embodiment of the disclosure. As shown in FIG. 1D, the isolation curve between the signal source 1412 and the signal source 1422 is isolation curve 141222, the isolation curve between the signal source 1412 and the signal source 1442 is isolation curve 141242, and the isolation curve between the signal source 1412 and the signal source 1432 is isolation curve 141232. As shown in FIG. 1D, good isolation could be achieved between the signal source 1412, the signal source 1422, the signal source 1432, and the signal source 1442 of the multi-feed antenna 1. FIG. 1E is a radiation efficiency curve diagram of the multi-feed antenna 1 according to an embodiment of the disclosure. As shown in FIG. 1E, the resonant modes 14121 and 14221 excited by the two adjacent signal sources 1412 and 1422 could both achieve good radiation efficiencies 14122 and 14222. The positions of the two adjacent signal sources 1432 and 1442 are approximately symmetrical to the positions of the signal sources 1412 and 1422. Therefore, the resonant modes 14321 and 14421 could also achieve good radiation efficiency characteristics.

The operation of communication band and experimental data covered in FIG. 1C, FIG. 1D, and FIG. 1E are only for the purpose of experimentally verifying the technical effect of the multi-feed antenna 1 of the embodiment disclosed in FIG. 1A. The aforementioned is not used to limit the communication bands, applications, and specifications that the multi-feed antenna 1 of the disclosure could cover in practical applications. The multi-feed antenna 1 may be configured in one set or multiple sets and applied to a multiple-input multiple-output antenna system, a pattern switching antenna system, or a beamforming antenna system.

Figure 2A:
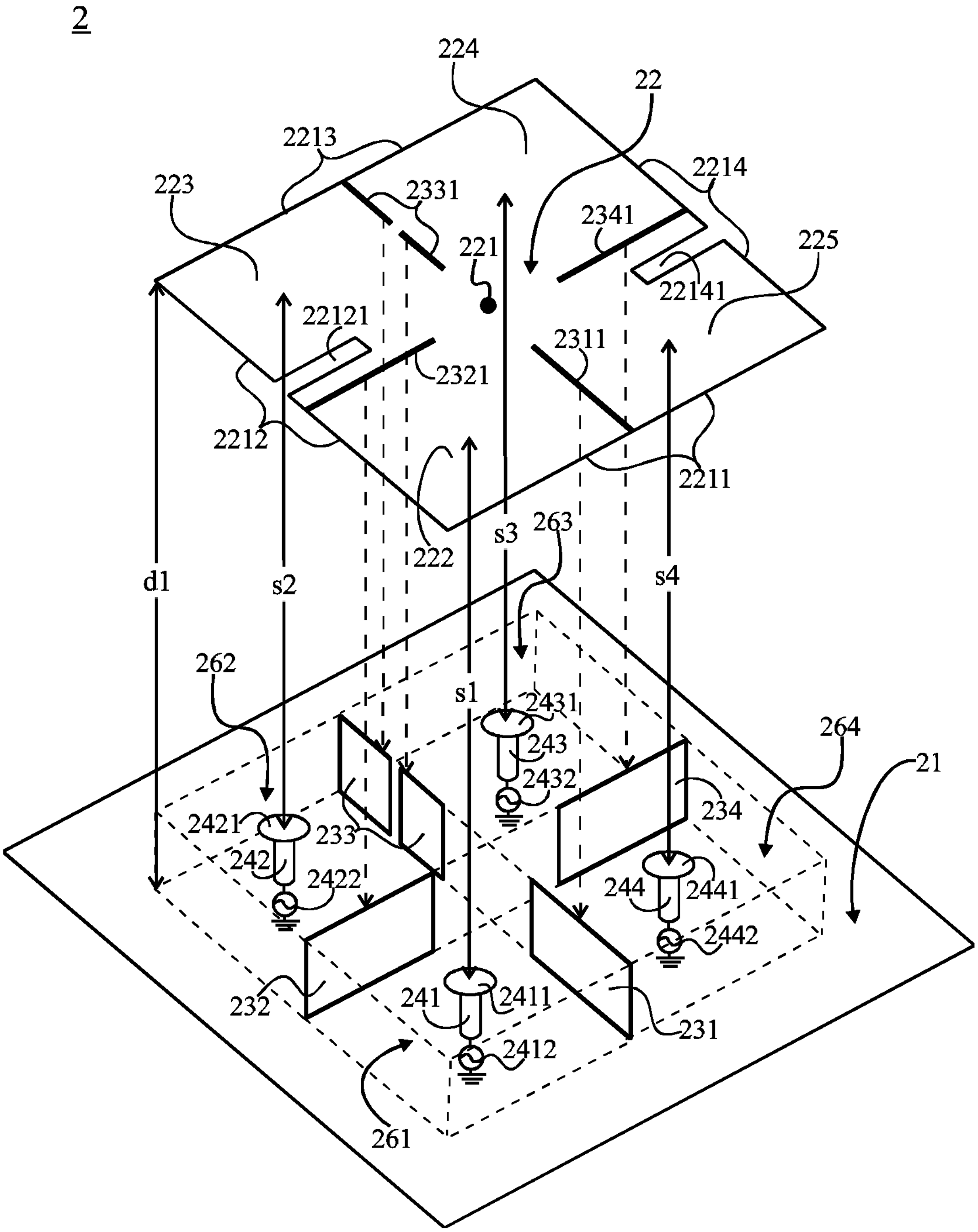
FIG. 2A is a structural diagram of a multi-feed antenna 2 according to an embodiment of the disclosure.
Figure 2B:
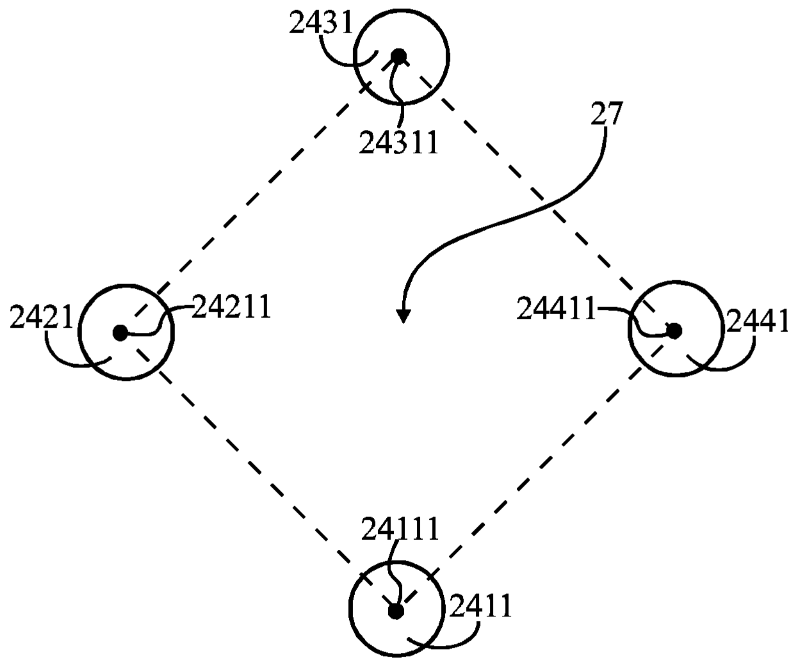
FIG. 2B is a structural diagram of an enclosed region formed by connecting lines of the four electrical connection points of the four coupling conductor plates of the multi-feed antenna 2 according to an embodiment of the disclosure.
Figure 2C:
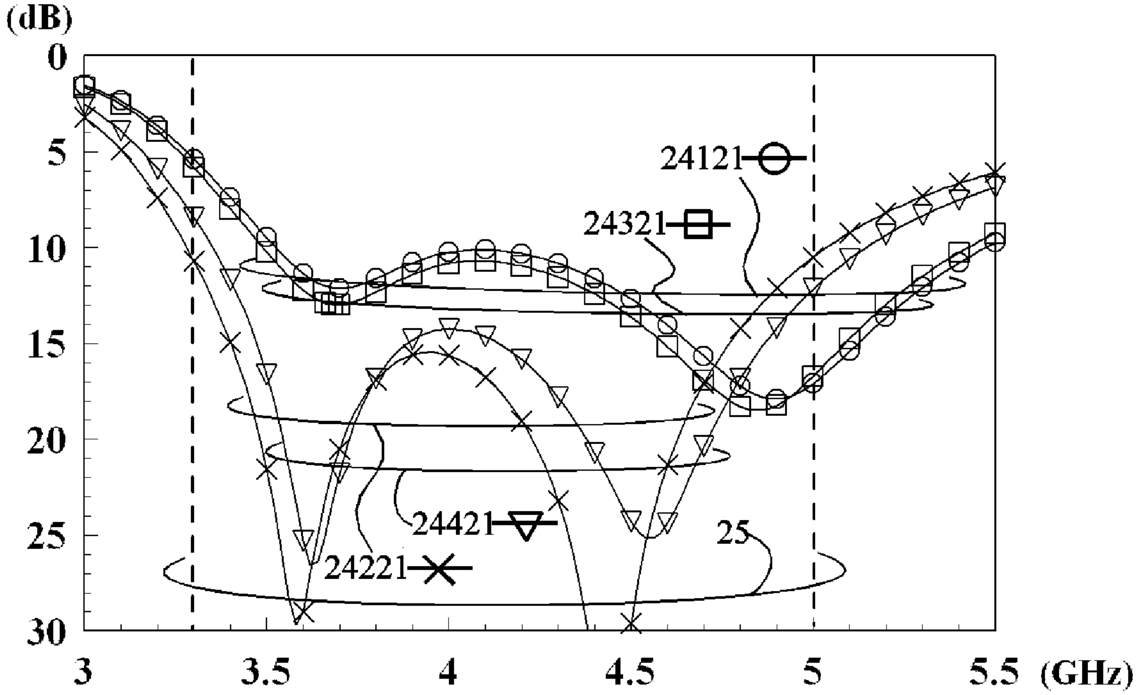
FIG. 2C is a return loss curve diagram of the multi-feed antenna 2 according to an embodiment of the disclosure.

FIG. 2A is a structural diagram of a multi-feed antenna 2 according to an embodiment of the disclosure. As shown in FIG. 2A, the multi-feed antenna 2 includes a first conductor layer 21, a second conductor layer 22, four supporting conductor structures 231, 232, 233, 234, and four feeding conductor lines 241, 242, 243, 244. The second conductor layer 22 has a first center position 221, and the second conductor layer 22 is spaced apart from the first conductor layer 21 at a first interval d1. The four supporting conductor structures 231, 232, 233, 234 are all located between the first conductor layer 21 and the second conductor layer 22, and electrically connect the first conductor layer 21 and the second conductor layer 22 respectively. The four supporting conductor structures 231, 232, 233, 234 form four electrically connected sections 2311, 2321, 2331, 2341 at the second conductor layer 22. Moreover, the four electrically connected sections 2311, 2321, 2331, 2341 respectively extend from different side edges 2211, 2212, 2213, 2214 of the second conductor layer 22 toward the first center position 221, so that the second conductor layer 22 forms four mutually connected radiating conductor plates 222, 223, 224, 225. The supporting conductor structures 231, 232, 234 are all composed of a single conductor plate. The supporting conductor structure 233 is composed of two conductor plates. Different side edges 2212, 2214 of the second conductor layer 22 are provided with slot structures 22121, 22141 to reduce the area of the second conductor layer 22. The four feeding conductor lines 241, 242, 243, 244 are all located between the first conductor layer 21 and the second conductor layer 22. The four feeding conductor lines 241, 242, 243, 244 and the four supporting conductor structures 231, 232, 233, 234 form an interleaved annular arrangement. Each of the feeding conductor lines 241, 242, 243, 244 has one end electrically connected to an electrical connection point 24111, 24211, 24311, 24411 (as shown in FIG. 2B) of a coupling conductor plate 2411, 2421, 2431, 2441 respectively. Each of the coupling conductor plates 2411, 2421, 2431, 2441 is spaced apart from a different one of the radiating conductor plates 222, 223, 224, 225 at a coupling interval s1, s2, s3, s4 respectively. Each of the feeding conductor lines 241, 242, 243, 244 has another end electrically connected to a signal source 2412, 2422, 2432, 2442 respectively. The four feeding conductor lines 241, 242, 243, 244 excite the second conductor layer 22 to generate at least four resonant modes 24121, 24221, 24321, 24421 (as shown in FIG. 2C), and the at least four resonant modes 24121, 24221, 24321, 24421 cover at least one identical first communication band 25. The coupling conductor plates 2411, 2421, 2431, 2441 are located between the first conductor layer 21 and the second conductor layer 22. The gap of the coupling intervals s1, s2, s3, s4 is between 0.005 wavelength and 0.088 wavelength of the lowest operating frequency of the first communication band 25. The four supporting conductor structures 231, 232, 233, 234 form four different resonant spaces 261, 262, 263, 264 in the region between the first conductor layer 21 and the second conductor layer 22, and the four feeding conductor lines 241, 242, 243, 244 are located in different resonant spaces 261, 262, 263, 264, respectively. The gap of the first interval d1 is between 0.01 wavelength and 0.38 wavelength of the lowest operating frequency of the first communication band 25. The area of the second conductor layer 22 is between 0.25 wavelength squared and 0.99 wavelength squared of the lowest operating frequency of the first communication band 25. FIG. 2B is a structural diagram of an enclosed region 27 formed by connecting lines of the four electrical connection points 24111, 24211, 24311, 24411 of the four coupling conductor plates 2411, 2421, 2431, 2441 of the multi-feed antenna 2 according to an embodiment of the disclosure. The connecting lines of the four electrical connection points 24111, 24211, 24311, 24411 constitute an enclosed region 27 whose area is between 0.1 wavelength squared and 0.49 wavelength squared of the lowest operating frequency of the first communication band 25. The area of the enclosed region 27 is smaller than the area of the second conductor layer 22. The gap of the slot structures 22121, 22141 is between 0.005 wavelength and 0.088 wavelength of the lowest operating frequency of the first communication band 25. The first conductor layer 21 and the second conductor layer 22 may also be implemented on a single-layer or multi-layer dielectric substrate. According to an embodiment of the disclosure, the shape of the second conductor layer 22 of the multi-feed antenna 2 is square, and the shape of the second conductor layer 22 may also be rectangular, circular, elliptical, rhombic, polygonal or other irregular shapes, or a combination of slot shapes. The signal sources 2412, 2422, 2432, 2442 could be transmission lines, impedance matching circuits, amplifier circuits, feed-in networks, switch circuits, connector components, filter circuits, integrated circuit chips, or radio frequency front-end modules. The multi-feed antenna 2 may be configured in one set or multiple sets and applied to a multiple-input multiple-output antenna system, a pattern switching antenna system, or a beamforming antenna system.

Figure 2D:
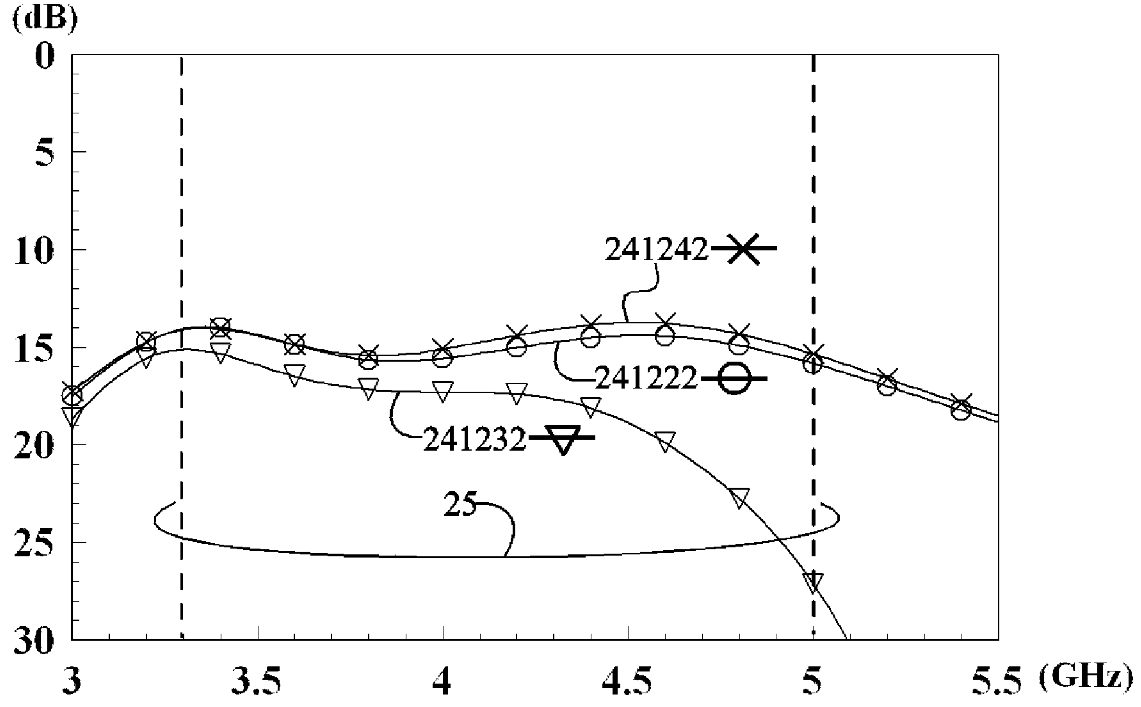
FIG. 2D is an isolation curve diagram of the multi-feed antenna 2 according to an embodiment of the disclosure.
Figure 2E:
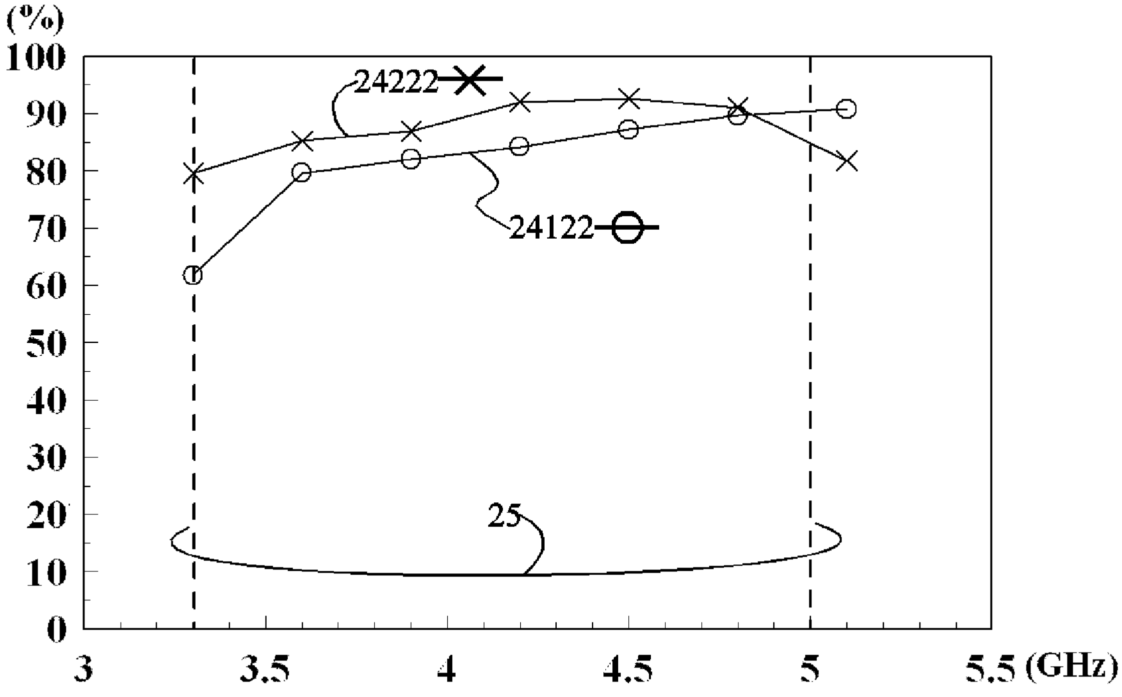
FIG. 2E is a radiation efficiency curve diagram of the multi-feed antenna 2 according to an embodiment of the disclosure.

In FIG. 2A, an embodiment of the multi-feed antenna 2 is disclosed. Although the supporting conductor structures 231, 232, 234 are designed to be composed of a single conductor plate, the supporting conductor structure 233 is composed of two conductor plates. Moreover, the different side edges 2212, 2214 of the second conductor layer 22 are configured with the slot structures 22121, 22141 to reduce the area of the second conductor layer. Also, the coupling conductor plates 2411, 2421, 2431, 2441 are designed to be located between the first conductor layer 21 and the second conductor layer 22. Therefore, the structure of the multi-feed antenna 2 of the embodiment and the multi-feed antenna 1 of the embodiment are not completely the same. However, the multi-feed antenna 2 is also designed with the four supporting conductor structures 231, 232, 233, 234 to form the four electrically connected sections 2311, 2321, 2331, 2341 at the second conductor layer 22. Moreover, the four electrically connected sections 2311, 2321, 2331, 2341 are similarly designed to respectively extend from different side edges 2211, 2212, 2213, 2214 of the second conductor layer 22 toward the first center position 221, so that the second conductor layer 22 forms four mutually connected radiating conductor plates 222, 223, 224, 225. Thus, a technical effect of reduction of the multi-antenna size with the four co-excited and co-existed resonant modes 24121, 24221, 24321, 24421 could also be achieved (as shown in FIG. 2C). The multi-feed antenna 2 is also designed by arranging the four feeding conductor lines 241, 242, 243, 244 and the four supporting conductor structures 231, 232, 233, 234 between the first conductor layer 21 and the second conductor layer 22 in an interleaved annular arrangement. Also, the four supporting conductor structures 231, 232, 233, 234 are designed to form four different resonant spaces 261, 262, 263, 264 in the region between the first conductor layer 21 and the second conductor layer 22, and the four feeding conductor lines 241, 242, 243, 244 are located in different resonant spaces 261, 262, 263, 264, respectively. Thus, good energy isolation could be achieved between the four resonant modes 24121, 24221, 24321, 24421 (as shown in FIG. 2D). The multi-feed antenna 2 is also designed such that each of the coupling conductor plates 2411, 2421, 2431, 2441 is spaced apart from a different one of the radiating conductor plates 222, 223, 224, 225 at a coupling interval s1, s2, s3, s4 respectively. Also, the gap of the coupling intervals s1, s2, s3, s4 is also designed to be between 0.005 wavelength and 0.088 wavelength of the lowest operating frequency of the first communication band 25. Thus, good impedance matching of the four resonant modes 24121, 24221, 24321, 24421 could also be achieved successfully (as shown in FIG. 2C). The multi-feed antenna 2 is also designed to have the first interval d1 between 0.01 wavelength and 0.38 wavelength of the lowest operating frequency of the first communication band 25, and the area of the second conductor layer 22 between 0.25 wavelength squared and 0.99 wavelength squared of the lowest operating frequency of the first communication band 25. Also, the connecting lines of the four electrical connection points 24111, 24211, 24311, 24411 of the four coupling conductor plates 2411, 2421, 2431, 2441 are also designed to constitute an enclosed region 27 (as shown in FIG. 2B) whose area is also between 0.1 wavelength squared and 0.49 wavelength squared of the lowest operating frequency of the first communication band 25, and the area of the enclosed region 27 is also smaller than the area of the second conductor layer 22. Thus, the multi-feed antenna 2 could also be excited to generate good radiation efficiency characteristics (as shown in FIG. 2E). The multi-feed antenna 2 may be configured in one set or multiple sets and applied to a multiple-input multiple-output antenna system, a pattern switching antenna system, or a beamforming antenna system. Therefore, the multi-feed antenna 2 of an embodiment of the disclosure could also achieve the same technical effect of multi-antenna integration with compatibility characteristics as the multi-feed antenna 1 of the embodiment.

FIG. 2C is a return loss curve diagram of the multi-feed antenna 2 according to an embodiment of the disclosure. The following dimensions were chosen for experimentation: the gap of the first interval d1 is about 10 mm; the area of the second conductor layer 22 is approximately 1521 $mm^2$; the area of the enclosed region 27 is approximately 450 $mm^2$; the coupling intervals s1, s2, s3, s4 are all about 1 mm; the gap of the slot structures 22121, 22141 is both about 3 mm. As shown in FIG. 2C, the signal sources 2412, 2422, 2432, 2442 excite the multi-feed antenna 2 to generate four resonant modes 24121, 24221, 24321, 24421 with good impedance matching, and the four resonant modes 24121, 24221, 24321, 24421 cover at least one first communication band 25. In this embodiment, the frequency range of the first communication band 25 is 3300 MHz to 5000 MHz, and the lowest operating frequency of the first communication band 25 is 3300 MHz. FIG. 2D is an isolation curve diagram of the multi-feed antenna 2 according to an embodiment of the disclosure. As shown in FIG. 2D, the isolation curve between the signal source 2412 and the signal source 2422 is isolation curve 241222, the isolation curve between the signal source 2412 and the signal source 2442 is isolation curve 241242, and the isolation curve between the signal source 2412 and the signal source 2432 is isolation curve 241232. As shown in FIG. 2D, good isolation could be achieved between the signal source 2412, the signal source 2422, the signal source 2432, and the signal source 2442 of the multi-feed antenna 2. FIG. 2E is a radiation efficiency curve diagram of the multi-feed antenna 2 according to an embodiment of the disclosure. As shown in FIG. 2E, the resonant modes 24121 and 24221 excited by the two adjacent signal sources 2412 and 2422 both have good radiation efficiencies 24122 and 24222. The configuration and positions of the two other adjacent signal sources 2432 and 2442 are approximately symmetrical to the signal sources 2412 and 2422. Therefore, the resonant modes 24321 and 24421 could also achieve good radiation efficiency characteristics.

The operation of communication band and experimental data covered in FIG. 2C, FIG. 2D, and FIG. 2E are only for the purpose of experimentally verifying the technical effect of the multi-feed antenna 2 of the embodiment disclosed in FIG. 2A. The aforementioned is not used to limit the communication bands, applications, and specifications that the multi-feed antenna 2 of the disclosure could cover in practical applications. The multi-feed antenna 2 may be configured in one set or multiple sets and applied to a multiple-input multiple-output antenna system, a pattern switching antenna system, or a beamforming antenna system.

In summary, although the disclosure has been described in detail with reference to the above embodiments, they are not intended to limit the disclosure. Those skilled in the art should understand that it is possible to make changes and modifications without departing from the spirit and scope of the disclosure. Therefore, the protection scope of the disclosure shall be defined by the following claims.

What is claimed is:

1. A multi-feed antenna, comprising:

a first conductor layer;

a second conductor layer, having a first center position, wherein the second conductor layer is spaced apart from the first conductor layer at a first interval;

four supporting conductor structures, all located between the first conductor layer and the second conductor layer and respectively electrically connecting the first conductor layer and the second conductor layer, wherein the four supporting conductor structures form four electrically connected sections at the second conductor layer, and the four electrically connected sections respectively extend from different side edges of the second conductor layer toward the first center position, so that the second conductor layer forms four mutually connected radiating conductor plates; and four feeding conductor lines, all located between the first conductor layer and the second conductor layer, wherein the four feeding conductor lines and the four supporting conductor structures form an interleaved annular arrangement, wherein each of the feeding conductor lines has one end electrically connected to an electrical connection point of a coupling conductor plate, each of the coupling conductor plates is spaced apart from a different one of the radiating conductor plates at a coupling interval, and each of the feeding conductor lines has another end electrically connected to a signal source respectively, wherein the four feeding conductor lines excite the second conductor layer to generate at least four resonant modes, and the at least four resonant modes cover at least one identical first communication band, wherein the four supporting conductor structures form four different resonant spaces in a region between the first conductor layer and the second conductor layer, and the four feeding conductor lines are located in different ones of the resonant spaces, respectively, wherein the gap of the coupling interval is between 0.005 wavelength and 0.088 wavelength of a lowest operating frequency of the first communication band.

2. The multi-feed antenna according to claim 1, wherein the gap of the first interval is between 0.01 wavelength and 0.38 wavelength of a lowest operating frequency of the first communication band.

3. The multi-feed antenna according to claim 1, wherein an area of the second conductor layer is between 0.25 wavelength squared and 0.99 wavelength squared of a lowest operating frequency of the first communication band.

4. The multi-feed antenna according to claim 1, wherein connecting lines of the four electrical connection points constitute an enclosed region whose area is between 0.1 wavelength squared and 0.49 wavelength squared of a lowest operating frequency of the first communication band.

5. The multi-feed antenna according to claim 4, wherein the area of the enclosed region is smaller than an area of the second conductor layer.

6. The multi-feed antenna according to claim 1, wherein the signal source is a transmission line, an impedance matching circuit, an amplifier circuit, a feed-in network, a switch circuit, a connector component, a filter circuit, an integrated circuit chip, or a radio frequency front-end module.

7. The multi-feed antenna according to claim 1, wherein the supporting conductor structure is composed of a plurality of conductor lines.

8. The multi-feed antenna according to claim 1, wherein the supporting conductor structure is composed of one or more conductor plates.

9. The multi-feed antenna according to claim 1, wherein different side edges of the second conductor layer are provided with slot structures to reduce an area of the second conductor layer.

10. The multi-feed antenna according to claim 9, wherein the gap of the slot structure is between 0.005 wavelength and 0.088 wavelength of a lowest operating frequency of the first communication band.

11. The multi-feed antenna according to claim 1, wherein the coupling conductor plate is located between the first conductor layer and the second conductor layer.

12. The multi-feed antenna according to claim 1, wherein the coupling conductor plate and the second conductor layer are located on a common plane.

13. The multi-feed antenna according to claim 1, wherein the multi-feed antenna is configured in one set or multiple sets and applied to a multiple-input multiple-output antenna system, a pattern switching antenna system, or a beamforming antenna system.

* * * * *